(12) United States Patent
Svensson (10) Patent No.: US 9,740,302 B2
(45) Date of Patent: Aug. 22, 2017

(54) AMBIDEXTROUS CHORD KEYING DEVICE FOR USE WITH HAND-HELD COMPUTER

(71) Applicant: Sten Michael Chapin Svensson, Newtown, CT (US)

(72) Inventor: Sten Michael Chapin Svensson, Newtown, CT (US)

( * ) Notice: Subject to any disclaimer, the term of this patent is extended or adjusted under 35 U.S.C. 154(b) by 248 days.

(21) Appl. No.: 14/210,340

(22) Filed: Mar. 13, 2014

(65) Prior Publication Data

US 2014/0267058 A1 Sep. 18, 2014

Related U.S. Application Data

(60) Provisional application No. 61/852,245, filed on Mar. 14, 2013.

(51) Int. Cl.
*G06F 3/023* (2006.01)
*G06F 3/02* (2006.01)
*H04M 1/23* (2006.01)

(52) U.S. Cl.
CPC .......... *G06F 3/0235* (2013.01); *G06F 3/0202* (2013.01); *G06F 3/0219* (2013.01); *H04M 1/236* (2013.01)

(58) Field of Classification Search
CPC .......... G06F 3/0235; G06F 3/02; G06F 3/014; G06F 3/0219; G06F 3/0224; G06F 3/0202; G06F 1/1662; G06F 1/1664; G06F 1/1671; H04M 1/236
See application file for complete search history.

(56) References Cited

U.S. PATENT DOCUMENTS

| | | | | |
|---|---|---|---|---|
| 5,432,510 A | * | 7/1995 | Matthews | H03K 17/967 341/20 |
| 5,515,305 A | * | 5/1996 | Register | G06F 1/1626 400/486 |
| 6,625,283 B1 | * | 9/2003 | Sato | G06F 1/1626 379/368 |
| 6,947,028 B2 | * | 9/2005 | Shkolnikov | G06F 1/1626 345/156 |
| 7,253,749 B2 | * | 8/2007 | Lai | A63F 9/0073 341/20 |
| 8,803,831 B1 | * | 8/2014 | Priest-Dorman | G06F 1/1643 345/156 |

(Continued)

FOREIGN PATENT DOCUMENTS

WO WO 03/007117 A2 * 1/2003

*Primary Examiner* — John Villecco (57) ABSTRACT

An ambidextrous, hand held data management device that has been ergonomically optimized to facilitate multiple key per character input, chording while holding a hand-held computer. The device has an arrangement of multiple keys which are so situated that the device can be operated in either the left or the right hand and data can be quickly and conveniently input, that is, any combination of keys can be quickly and conveniently indicated without a hand strap and without dropping the device. The ergonomic arrangement of keys and the shape of the frame allows for the device to remain comfortably stationary relative to the palm of the hand while in use. The device is primarily a mobile data input device, enabling keying of characters with the hand concurrently holding the device around the periphery, maximizing the hand-held screen availability dowards displaying content.

1 Claim, 6 Drawing Sheets

(56) References Cited

U.S. PATENT DOCUMENTS

| | | | | |
|---|---|---|---|---|
| 2002/0044072 | A1* | 4/2002 | Suzumura | G06F 3/018 341/22 |
| 2003/0052164 | A1* | 3/2003 | Higginson | G06F 3/021 235/380 |
| 2003/0137802 | A1* | 7/2003 | Von Novak | G06F 1/1626 361/679.09 |
| 2004/0046733 | A1* | 3/2004 | Forlenza | G06F 3/0233 345/156 |
| 2004/0239632 | A1* | 12/2004 | Lai | A63F 9/0073 345/168 |
| 2011/0215954 | A1* | 9/2011 | Page | G06F 3/0235 341/22 |
| 2014/0071056 | A1* | 3/2014 | Liu | G06F 1/1626 345/169 |
| 2015/0109151 | A1* | 4/2015 | Page | G06F 3/04886 341/22 |
| 2015/0293607 | A1* | 10/2015 | Wu | G06F 3/0235 345/169 |
| 2016/0005150 | A1* | 1/2016 | Ghassabian | G06F 3/0488 345/654 |
| 2016/0048668 | A1* | 2/2016 | Zafiris | G06F 21/32 726/19 |

\* cited by examiner

AMBIDEXTROUS CHORD KEYING DEVICE FOR USE WITH HAND-HELD COMPUTER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of electronic input devices, or data input systems. More particularly, the present invention is in the technical field of keying devices. More particularly, the present invention is in the technical field of chording keying devices.

Data input devices to date, suitable for use with portable, hand held computers typically known as PDAs (Personal Data Assistant) or "Smart Phones" have required that the hand held computers be larger, or thicker, in order to accommodate small physical keyboards, commonly of the QWERTY type as standard on larger laptop or desktop computers, or have had a compromised viewing space on the hand held computer in use, as a portion of the touch sensitive screen is utilized to display the keyboard during input. Hand held chording type keyboards have required a method of operation which uses both hands together, or they have employed a physical configuration not readily suited for use with a hand held computer. Further, for the chording solutions, the mappings of finger combinations to the alphabet have been difficult to learn.

SUMMARY OF THE INVENTION

The present invention is an ambidextrous hand-held and operated electronic input device for a user to input characters using separate finger or thumb presses, or combinations of digit presses.

The present invention is a data input device for users to type data to a hand held computer (PDA, "smart phone"), operating with the hand holding the present invention also supporting the hand held computer in a comfortable and natural grip.

The present invention is a hand held chording data input device which, when mounted on the perimeter of a hand held computer, positions the input keys to enable operation with the hand remaining in a relaxed position.

DRAWING REFERENCE NUMERALS

1 data input device
2 two-stage DPST pushbutton [DPST=double pole single throw]
3 standard convention circuit diagram [for a two-stage DPST pushbutton]
4 mapping of digit chord values to corresponding characters
10 frame
12 thumb pushbutton
14 index finger pushbutton
16 middle finger pushbutton
18 ring finger pushbutton
20 little finger pushbutton
22 alternate thumb pushbutton
24 track ball mouse button
26 micro-processor
28 cable
30 alpha-numeric character display
32 curved finger edge
34 palm edge
36 palm rest
38 plunger
40 middle electrically conductive section
42 bottom electrically conductive section
44 non-conducting sleeve
46 side contacts
48 bottom contacts
50 coil spring
52 thumb column
54 index finger column
56 middle finger column
58 ring finger column
60 little anger column
62 row A
64 row B
66 row C
68 row D
70 row E
72 row F
74 row G
76 row H
78 row I
80 row J
82 row K
84 row L
86 row M
88 row N
90 row O
92 row P
94 row Q
96 row R
98 row S
100 row T
102 row U 104 row V
106 row W
108 row X
110 row Y
112 row Z

DETAILED DESCRIPTION OF THE INVENTION

Figure 1:
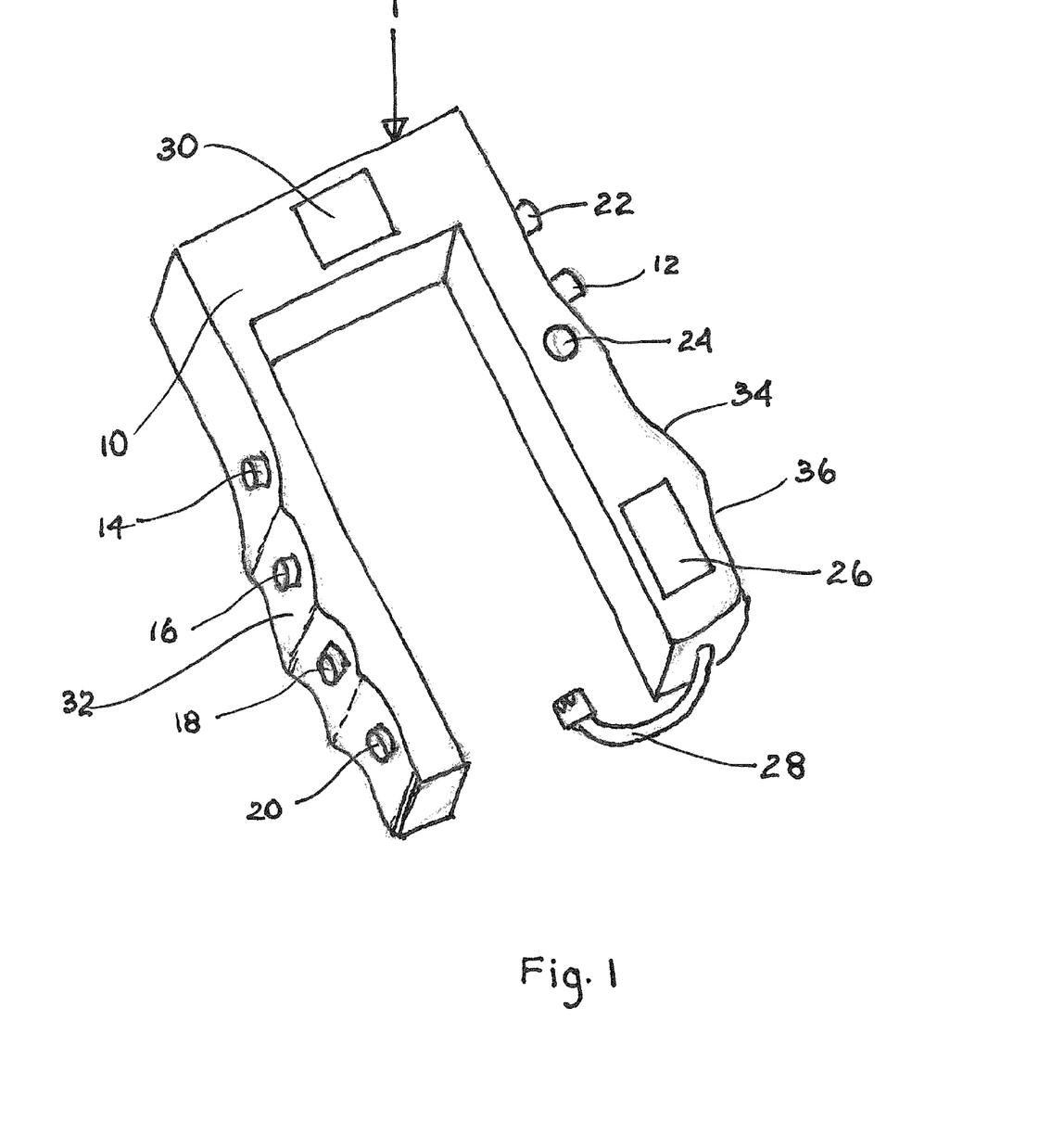
FIG. 1 is a left side perspective view of a data input device of the present invention.
Figure 2:
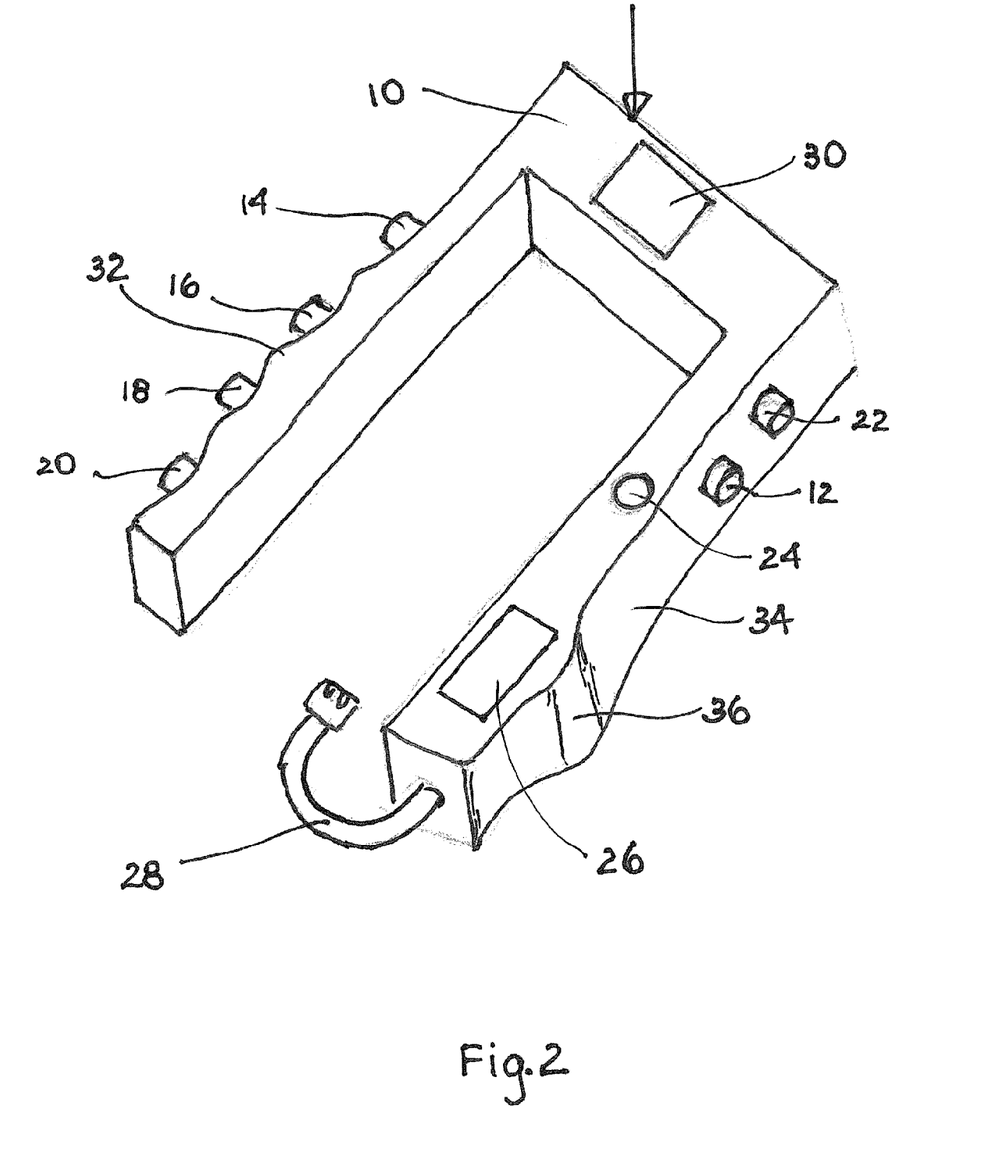
FIG. 2 is a right side perspective view of a data input device of the present invention.
Figure 3:
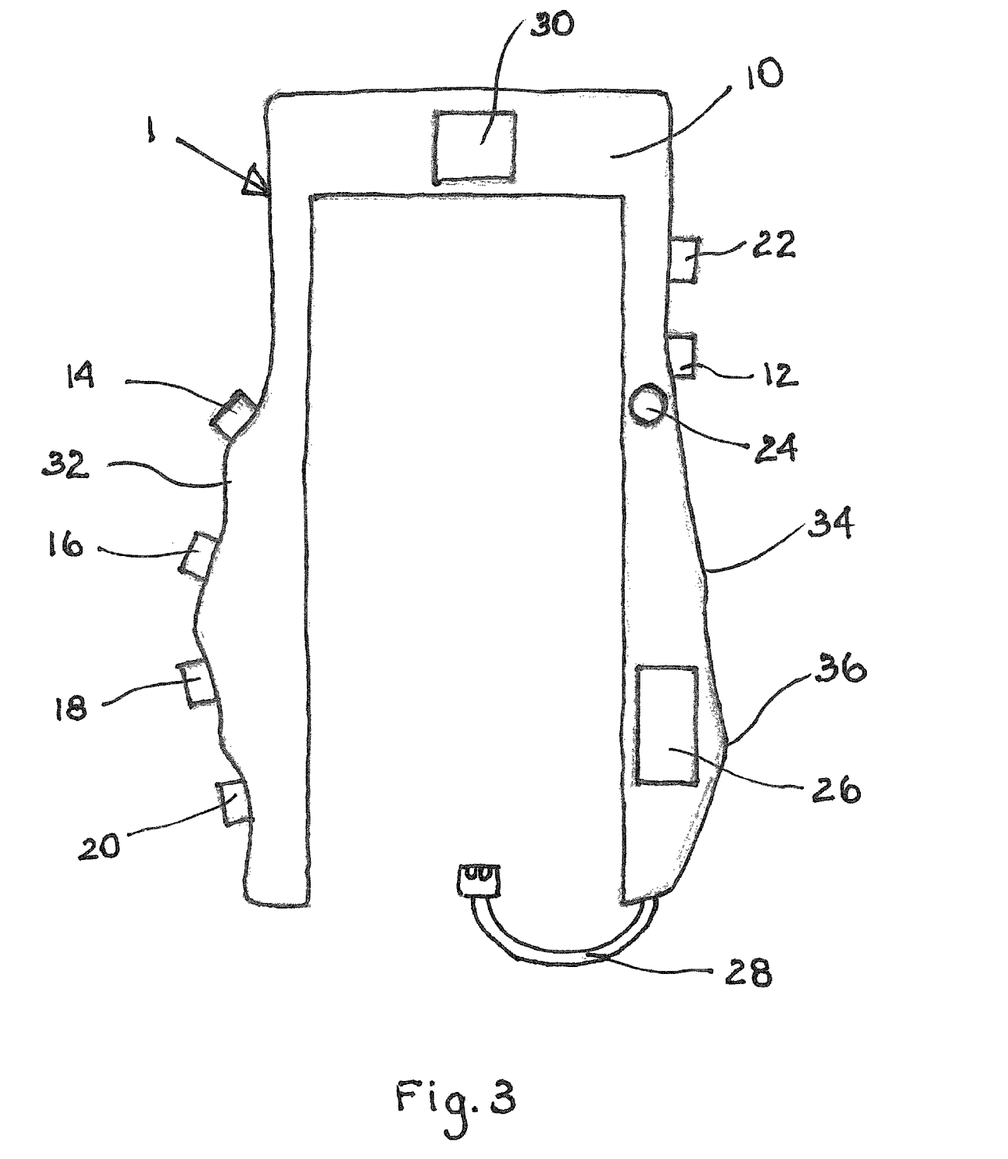
FIG. 3 is a top view of a data input device of the present invention.

Referring now to the invention in more detail, in FIG. 1 to FIG. 3, there is shown a data input device 1 having a frame 10, holding an index finger pushbutton 14, a middle finger pushbutton 16, a ring finger pushbutton 18 and a little finger pushbutton 20 mounted within a curved finger edge 32 of one side of the frame 10. A thumb pushbutton 12 and an alternate thumb pushbutton 22 are mounted within the frame 10 along the palm edge 34. The palm edge 34 is on the opposite side of the frame 10 from the curved finger edge 32. A track ball mouse button 24 is mounted along the top surface of palm edge 34. The palm edge 34 includes a palm rest 36 portion which includes a microprocessor 26 within the interior. All pushbuttons and the trackball are wired to the microprocessor 26. A means to provide power to the microprocessor 26 and to convey the data signals generated by the invention is provided by a cable 28. Alternatively, a battery and a form of wireless communication with the hand-held computer, as Bluetooth, may be deployed in lieu of cable 28.

In more detail, still referring to the invention of FIG. 1 to FIG. 3, in the preferred embodiment, the index finger pushbutton 14, the middle finger pushbutton 16, the ring finger pushbutton 18, the little finger pushbutton 20, and the thumb pushbutton 12, are two-stage double-pole, single-throw normally open momentary pushbuttons. The two-stage button functionality may alternatively be emulated using analog, continuously variable pressure type switches. The alternative thumb pushbutton 22 may use a simple, single-pole, single-throw momentary normally open push button, and is employed to provide different translation tables, such as capital letters, and different punctuation. Multiple alternative buttons, or a button type supporting multiple states may be used to expand characters to numerals, foreign language character sets, as examples.

Figure 4:
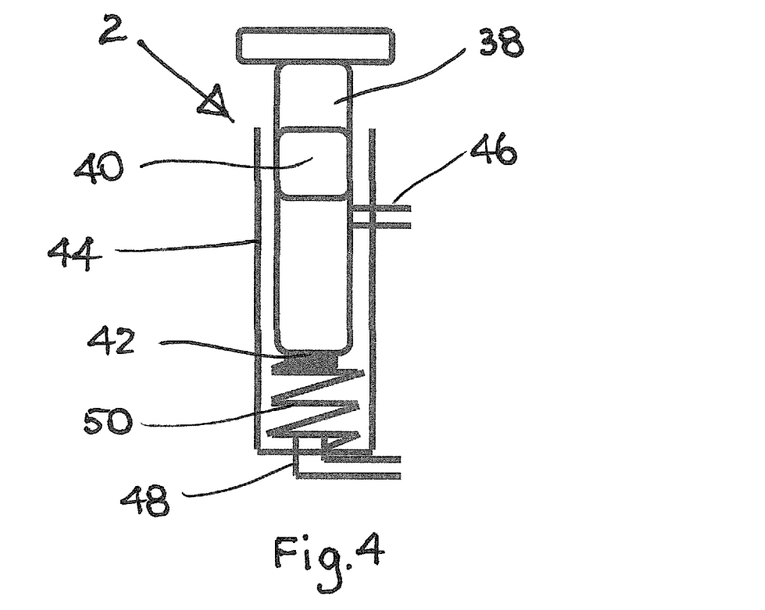
FIG. 4 is a side view of an un-pressed pushbutton of a data input device of the present invention.
Figure 5:
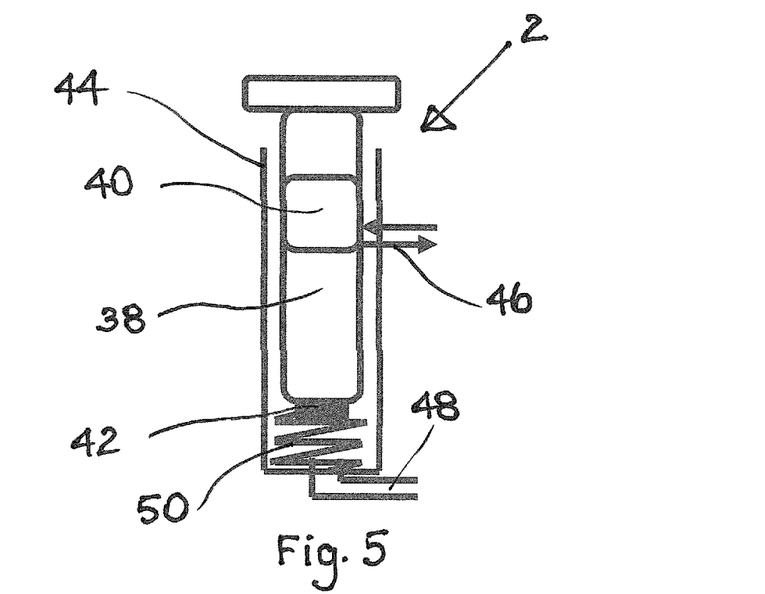
FIG. 5 is a side view of a partially pressed pushbutton of a data input device of the present invention.
Figure 6:
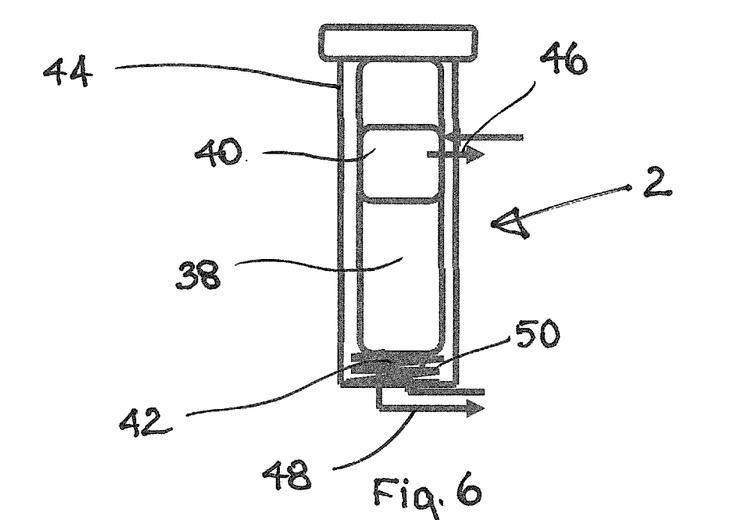
FIG. 6 is a side view of a fully pressed pushbutton of a data input device of the present invention.

Referring now to FIG. 4 to FIG. 6 for operational detail of two-stage double-pole, single-throw normally open momentary pushbuttons. The two-stage DPST pushbutton 2 is comprised of a plunger 38, containing a middle electrically conductive section 40, and a bottom electrically conductive section 42. The plunger 38 is contained within a non-conducting sleeve 44, which contains a pair of side contacts 46 and a pair of bottom contacts 48. The plunger 38 is of dimension such that it may slide freely when pushed down into the sleeve 44, until stopped when the bottom electrically conductive section 42 comes into contact with the bottom electrical contacts 48. When the plunger 38 is released, it is returned to its initial position by a coil spring 50, as in the operation of a standard pushbutton.

In more detail FIG. 4 shows the two-stage DPST pushbutton 2, when the plunger 38 is not pushed. The middle electrically conductive section 40, of the plunger 38, is not in contact with the pair of side contacts 46, of sleeve 44, and the bottom electrically conductive section 42, is not in contact with the bottom contacts 48, of sleeve 44.

In more detail FIG. 5 shows the two-stage DPST pushbutton 2, when the plunger 38 is partially pushed. The middle electrically conductive section 40, of the plunger 38, is in contact with the pair of side contacts 46, of sleeve 44, and the bottom electrically conductive section 42, is not in contact with bottom contacts 48, of sleeve 44.

In more detail, FIG. 6 shows the two-stage DPST pushbutton 2, when the plunger 38 is fully pushed. The middle electrically conductive section 40, of the plunger 38, remains in contact with the pair of side contacts 46, of sleeve 44, and the bottom electrically conductive section 42, is in contact with bottom contacts 48, of sleeve 44.

Figure 7:
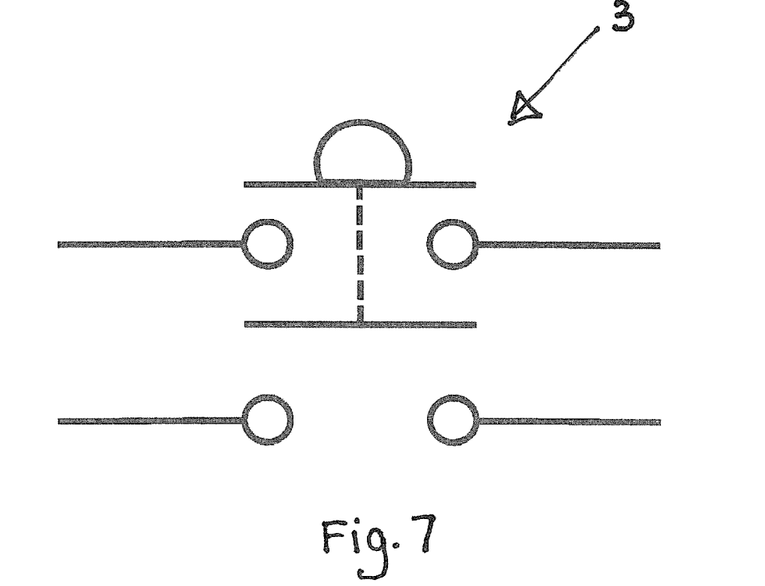
FIG. 7 is a circuit diagram of a pushbutton of a data input device of the present invention.

Referring now to FIG. 7 for a standard convention circuit diagram 3 of such a two-stage, double-pole, single-throw momentary normally open pushbutton.

In further detail, referring again to the invention of FIG. 1 to FIG. 3, the index finger pushbutton 14, the middle finger pushbutton 16, the ring finger pushbutton 18, the little finger pushbutton 20, and the thumb pushbutton 12, will each have two separate electrical connections to the micro-processor 26. A partial-push, (or partial closing), of the index finger pushbutton 14, the middle finger pushbutton 16, the ring finger pushbutton 18, the little finger pushbutton 20, or the thumb pushbutton 12, will result is a switch from an "off" to an "on" state at the first of its two corresponding input pins on the micro-processor 26. Similarly, a complete-push of any of the index finger pushbutton 14, the middle finger pushbutton 16, the ring finger pushbutton 18, the little finger pushbutton 20, or the thumb pushbutton 12, will have both electrical connections to the micro-processor 26, switched to an "on" state. Every complete-push "on" state also has a partial-push "on" state. This enables an intended chord to be recognized by logic running on the micro-processor 26. The logic reads all the pushbutton partial-push "on" states, triggered when a complete-push "on" state is detected. After reading the intended chord, the corresponding value is sent to the accompanying hand-held computer over the cable 28.

Figure 8:
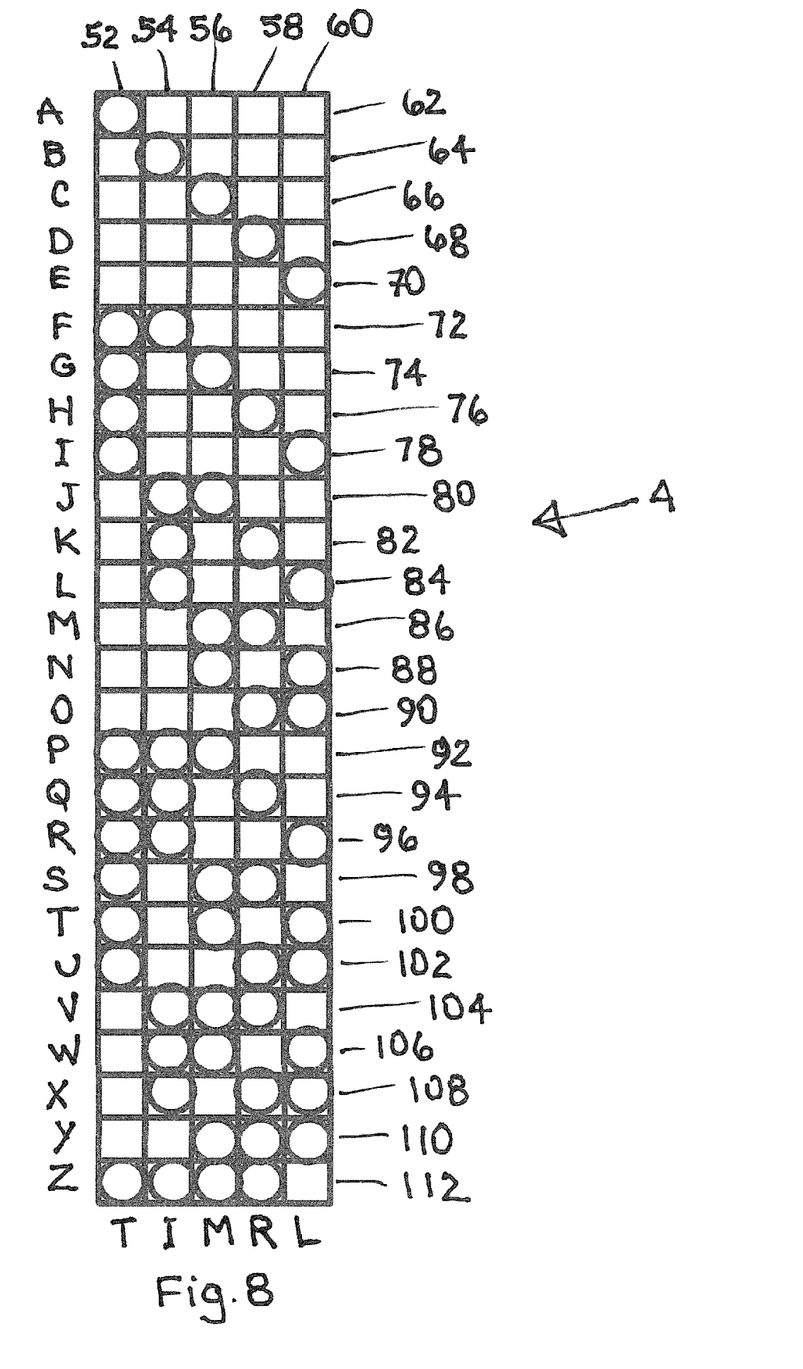
FIG. 8 is a chord-to-text translation table of a data input device of the present invention.

Refer now to FIG. 8, for the preferred mapping of digit chord values to corresponding characters 4. Thumb column 52 indicates a pressed pushbutton with a circle. Index finger column 54 indicates a pressed pushbutton with a circle. Middle finger column 56 indicates a pressed pushbutton with a circle. Ring finger column 58 indicates a pressed pushbutton with a circle. Little finger column 60 indicates a pressed pushbutton with a circle. Row A 62 shows the keying for letter "A". Row B 64 shows the keying for letter "B". Row C 66 shows the keying for letter "C". Row D 68 shows the keying for letter "D". Row E 70 shows the keying for letter "E". Row F 72 shows the keying for letter "F". Row G 74 shows the keying for letter "G". Row H 76 shows the keying for letter "H". Row I 78 shows the keying for letter "I". Row J 80 shows the keying for letter "J". Row K 82 shows the keying for letter "K". Row L 84 shows the keying for letter "L". Row M 86 shows the keying for letter "M". Row N 88 shows the keying for letter "N". Row O 90 shows the keying for letter "O". Row P 92 shows the keying for letter "P". Row Q 94 shows the keying for letter "Q". Row R 96 shows the keying for letter "R". Row S 98 shows the keying for letter "S". Row T 100 shows the keying for letter "T". Row U 102 shows the keying for letter "U". Row V 104 shows the keying for letter "V". Row W 106 shows the keying for letter "W". Row X 108 shows the keying for letter "X". Row Y 110 shows the keying for letter "Y". Row Z 112 shows the keying for letter "Z".

This relationship map is designed to combine the common learned order of the Latin alphabet (ABCDEFGHIJKLM-NOPQRSTUVWXYZ) with the order of digits commonly used to count to five. (Thumb=1, index=2, middle=3, ring=4, little=5). This generally accepted order convention is continued as more than one digit needs to be combined to produce all possible combinations of the five digits. That is, thumb=A, index=B, middle=C, ring=D, little=E. This exhausts digits being used singularly. The next letter, F, will require two digits together. As the thumb was the first digit, it will be included until all pairs of digits which may be formed in combination with a thumb have been exhausted. That is, thumb+index=F, thumb+middle=G, thumb+ring=H, thumb+little=I. At this point all digit pairs which include the thumb have been exhausted and the pattern continues with the next digit (after the thumb), the index now being used for all possible pairs that can be formed with it. That is, index+middle=J, index+ring=K, index+little=L. This exhausts the pairs which may be formed with the index. The pattern continues until all pairs of digits has been assigned to a letter, then continues with the first combination requiring three digits; thumb+index+middle=P. For the pattern requiring three digits, the ordering of two of the three digits comprising the triplet remains consistent with the order in which pairs were formed. That is, the next triple after P will also keep the thumb and index (the first pair) and take the digit after the middle. That is, thumb+index+ring=Q. All combinations of three are formed recognizing the order in which pairs were formed. After triplets are exhausted, all combinations requiring four digits will be assigned, recognizing the order in which triplets were formed. By this fashion, the letter "Z" is formed with the first instance which requires four digits as shown in FIG. 8. This allows assignment of the remaining four possible quads and the chord formed by all digits, totaling five additional chords, to be used as punctuation marks as period, comma, space or delete. This rule of ordering supports rapid learning of this "chord alphabet", as letters may be "counted" up or down from known (learned) letters, following the generally known order of the Latin alphabet.

The construction details of the invention as show in FIG. 1 to FIG. 3 are that the frame 10 is of a size and shape to surround a hand-held personal computing device and support the holding hand in a relaxed position such that the fingers and thumb are comfortably engaged with their respective pushbuttons. A suitable size is about 3 inches wide and 5 inches high and about a half inch thick, constructed as a frame with space in the interior for the hand-held computer. The curved finger edge 32 is fashioned to accommodate the differing lengths of the fingers. The opposing palm edge 34 of the frame 10 has the palm edge 34 fashioned to engage the thumb-extension portion of the palm (along the thumb metacarpal) when held. In this fashion, the thumb does not actively hold the frame 10. The thumb may be used to press the thumb pushbutton 12, the alternative thumb pushbutton 22, and operate the track ball mouse button 24, all in turn, without need to shift the hand grip on the data input device 1. The frame 10, containing the hand-held computer, may be comfortably cradled by the hand, engaged by the top portion of the intermediate phalanges of the fingers and the palm-edge of the thumb metacarpal. A frame 10, fashioned in this way will allow the top of the fingers (the distal phalanges) and the thumb to move substantially freely, without the need to shift the grip on the frame 10. In operation, any small twisting, or torquing forces generated by any single finger or thumb press, or any combination of concurrent presses, will be minimal, supporting comfortable, relaxed usage.

The construction details of the invention as shown in FIG. 1 to FIG. 3 are that the frame 10 may be made of wood or any other sufficiently rigid and strong material such as high-strength plastic, metal, and the like. Further, the various components comprising the data input device 1 can be made of different materials, especially as needed to accommodate electrical requirements.

The advantages of the present invention include, without limitation, that chording data input may be produced comfortably by the same hand used to hold a hand-held computer, PDA, "Smartphone", etc. The invention, in use, supports the hand-held computer around the perimeter, providing a shape which supports a natural cradling hold, not requiring any portion of the screen be dedicated to data input. A further advantage is that the present invention, when used with an optional integrated alphanumeric character display will display the intended character before it has been sent to the hand-held computer, allowing for adjustment, avoiding the need to erase and replace the mistakenly produced character.

In broad embodiment, the present invention is an ambidextrous hand held keying device.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A hand-held keyboard, comprising:
a frame to be cradled with a single hand,
said frame with means of connection to a hand-held computing device or a smartphone,
said frame of configured to be held in a palm of said single hand, wherein said frame consists of a first side portion, a second side portion opposite the first side portion, and a top portion,
said frame configured such that operation of said hand-held keyboard is performed by digits of said single hand,
wherein said frame: including the first side portion, the second side portion, and the top portion, is configured to surround only a perimeter of said hand-held computing device or smartphone,
said frame further comprising a palm rest protruding from an outer surface the first side portion and positioned to be centered at a base of a thumb of said single hand when held, and fashioned to engage a thumb extension of said palm running along a thumb metacarpal,
said frame further comprising a curved finger portion protruding from an outer surface the second side portion and opposite said palm rest, wherein the curved finger portion is comprised of individual finger portions, wherein said individual finger portions are located at varying distances from said first side portion,
a plurality of multi state switches arranged along the first side portion and the curved finger portion of said frame in a fashion that said multi state switches are operated by said digits of said single hand concurrently with holding said frame,
a microprocessor running instructions to convert a plurality of possible combinations of switch states conveyed by operation of said multi state switches by said digits into corresponding characters, wherein said means of connection is configured to input said characters to said hand-held computing device or smartphone, whereby a user can input characters into said hand-held computing device or said smartphone.

* * * * *